United States Patent [19]

Brotzmann

[11] 4,195,985

[45] Apr. 1, 1980

[54] METHOD OF IMPROVEMENT OF THE HEAT-BALANCE IN THE REFINING OF STEEL

[75] Inventor: Karl Brotzmann, Sulzbach-Rosenberg, Fed. Rep. of Germany

[73] Assignee: Eisenwerk-Gesellschaft Maximilianshutte mbH., Sulzbach-Rosenberg, Fed. Rep. of Germany

[21] Appl. No.: 965,676

[22] Filed: Dec. 1, 1978

[30] Foreign Application Priority Data

Dec. 10, 1977 [DE] Fed. Rep. of Germany ....... 2755165
Sep. 7, 1978 [DE] Fed. Rep. of Germany ....... 2838983

[51] Int. Cl.² .......................... C21C 5/32; C21C 5/34
[52] U.S. Cl. ........................................... 75/60; 75/59
[58] Field of Search ............................. 75/52, 59, 60

[56] References Cited

U.S. PATENT DOCUMENTS

| | | | |
|---|---|---|---|
| 3,839,017 | 10/1974 | Schempp | 75/60 |
| 3,900,311 | 8/1975 | Nilles | 75/52 |
| 3,920,448 | 11/1975 | Knuppel | 75/60 |
| 3,953,199 | 4/1976 | Michaelis | 75/60 |
| 3,960,546 | 1/1976 | Rote | 75/60 |
| 3,999,977 | 12/1976 | Kolb | 75/52 |
| 4,047,936 | 9/1977 | Chang | 75/60 |

*Primary Examiner*—P. D. Rosenberg
*Attorney, Agent, or Firm*—Lawrence I. Field

[57] ABSTRACT

In the method of producing steel in a converter equipped with tuyeres that are shrouded with a protective medium which are disposed below the melt surface, oxygen is also introduced above the melt during at least a major part of the refining time with sufficient velocity to suck in large amounts of reaction products thereby increasing the proportion of the scrap that may be charged.

12 Claims, 1 Drawing Figure

U.S. Patent
Apr. 1, 1980
4,195,985
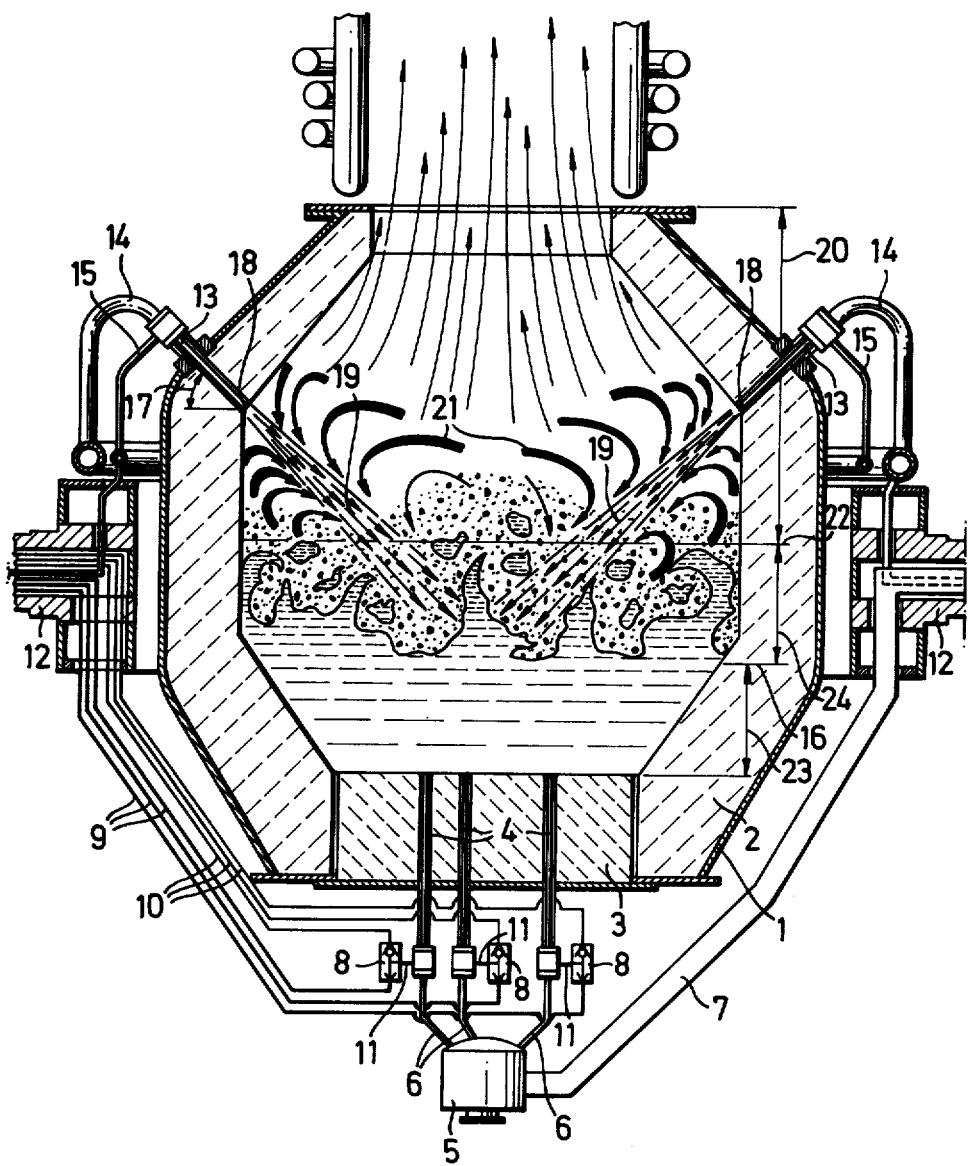

METHOD OF IMPROVEMENT OF THE HEAT-BALANCE IN THE REFINING OF STEEL

This invention relates to a method of improvement of the heat-balance and thereby of raising the proportion of scrap in the refining of pig iron in a convertor equipped with oxygen nozzles shrouded by a protective medium and discharging underneath the surface of the bath in the convertor.

Steel is for the most part produced by the employment of industrially pure oxygen in converters having a capacity from about 30 tons up to about 400 tons. In operating practice two different methods of refining have succeeded. Firstly there is the oxygen top-blowing process and secondly there is the oxygen through-blowing process (OBM-method/Q-BOP-method).

The oxygen through-blowing method utilizes oxygen nozzles having hydrocarbon shrouding, which consist of concentric tubes and are disposed underneath the surface of the bath in the converter brickwork.

The refining oxygen is charged with the slag-formers and by the introduction of the reagents through the nozzles into the melt optimum conditions are arrived at in the converter for the reaction kinetics so that even towards the end of the refining reaction there is still a strong movement of the bath. From that result the favourable metallurgical yields in the case of the refinement of steel, which are connected with significant economic advantages. However there exists a difference between the two methods of refinement in that about 3 points percent more scrap, that is, 30 kg/ton of steel can be used in the case of the oxygen top-blowing LD-method than in the case of the OBM/Q-BOP-method.

In the past there has been no lack of proposals for remedying individual disadvantages of the two oxygen converter refining methods. In this connection proposals have also become known, to combine both methods for special purposes.

The Austrian Patent Specification 168590 deals, for example, with the possibility in addition to the top blowing of feeding a nitrogen-free stirring gas into a converter through a nozzle in the sidewall underneath the surface of the bath in order to improve the movement of the bath. The disadvantage consists in an unfavourable heat-balance since the stirring gas extracts heat from the melt and the proportion of scrap drops accordingly.

The U.S. Pat. No. 3030203 describes a method in which first of all blowing is carried out onto the melt with an ordinary lance and after turning the converter the lance dips into the melt. In the case of this method the extraction of heat from the melt by the water-cooled lance makes itself noticeable in a disadvantageous way. Secondly the large amounts of oxygen introduced in a concentrated way lead to violent spattering and to increased ejection.

In the U.S. Pat. No. 3259484 the oxygen top-blowing lance is combined with a converter bottom of porous refractory material through which oxygen is introduced into the melt. But only relatively small amounts of oxygen can be conveyed through the porous bottom bricks and according to the state of knowledge today the introduction of oxygen through porous bricks leads to a very short working life of these bottoms of only a few melts.

The French Pat. No. 2121522 is concerned with a method which combines the simultaneous application of a lance with bottom nozzles. The blowing-in from above and below in that case happens in different zones of the bath. For example, in the first phase of refining, preferably in the desiliconization period oxygen is introduced into the melt only through the bottom nozzles. Subsequently the lance is passed into the converter and blows oxygen onto the bath. The aim is to produce steels rich in carbon with adequately low phosphorus content. In that case the duty which falls to the oxygen fed through the lance is mainly to raise the FeO-content of the slag as the prerequisite for the most extensive dephosphorization possible. At the same time the occurrence of brown smoke is to be reduced.

The German O/S 2237253 refers to the employment of nozzles of concentric tubes with a nozzle-protective medium, which are built into the refractory brickwork of the bottom as well as into the sidewall of a converter. The nozzles in the upper part of the sidewall serve for the feed of a suspension of powdery slag-formers and carrier gas. The sidewall nozzles may be arranged so that in the blast position of the converter they lie underneath the surface of the bath or else lie above it and blow obliquely onto the bath. As long as they blow onto the bath they are used only for the feeding of powdery slag formers. For the case where the nozzles are arranged underneath the surface of the bath an oxidizing carrier gas is utilized.

The object of the German O/S 2237253 consists essentially in blowing a suspension of carrier gas and powdery slag-formers onto the melt to be refined. By doing that the advantages of the introduction of the slag-forming substances according to the oxygen through-blowing method, for example, described in German Pat. No. 1966314 are no longer obtained.

The German A/S 2405351 refers to a combination of top-blowing lances and bottom nozzles. In that process at the start the refining is to be effected essentially by top-blowing from above and the oxygen feed from below is to be increased as soon as the refining action starts to slow up. According to the description this occurs at a carbon content between 0.2 to 0.05%. By top-blowing being preferred the method cannot avoid the disadvantages connected with it.

Furthermore there belong to the state of the art the German O/S 2522467, the East German Patent No. 101916 and the U.S. Pat. No. 3895784. They describe essentially the application of nozzles with hydrocarbon shrouding above the surface of the bath in an otherwise ordinary through-blowing converter, with the object in view of achieving CO-afterburning for improvement of the heat balance.

According to the German O/S 2522467 the CO-afterburning serves for the increase of the supply of heat in the upper region of the converter, the so-called cap, in order to avoid the formation of deposits at that point. The East German Patent describes the CO-afterburning in the converter and in other steel-refining vessels. The features considered as essential are the position of the oxygen nozzles above the surface of the bath and the amounts of oxygen fed to the bottom nozzles and the afterburning nozzles in relation to the development of CO in the melt.

The installation of in the afterburning nozzles is not to deviate up and down more than 20°, preferably not more than 10° from the horizontal. It is to be still more advantageous if the angle of the nozzles is inclined downwards slightly and deviates not more than 5° from the horizontal, in which case an angle of 4° has proved particularly advantageous. This statement reveals the great significance that is attributed to the approximately horizontal position of installation of the CO-afterburning nozzles.

The relative velocity of the oxygen blast through the bottom nozzles is to be regulated so that the CO-development is optimized and the necessary amount of oxygen is to be fed into a zone of the CO-development close to the upper face of the liquid bath in order to convert CO into $CO_2$. As the preferred amounts of oxygen for the sidewall nozzles the patent mentions 25% to 30%.

The U.S. Patent takes up essentially the basic idea of the controlled conversion of CO into $CO_2$ and describes a regulating circuit which measures the exhaust gas composition and controls the oxygen feed into the refining vessel to correspond, and also alters the position of installation of the oxygen inlet nozzles above the surface of the bath. To vary the position of installation of the nozzles in the converter wall during the refining period is in operating practice impracticable. The openings in the converter wall after a short time become blocked by steel spatter and corresponding deposits and hence unusable, and the nozzle tubes can then no longer be moved.

It is common to all of the methods described above that a sensible supply of heat to the iron melt in the converter to become effective in the refining process could not be achieved and therefore none of the known proposals has so far been put into operating practice.

The present invention has posed itself the problem of developing the production of steel in the bottom blown converter further in such a way that the heat-balance is improved and hence the proportion of solid iron-carriers, e.g., the proportion of scrap is significantly increased and the known advantages of the bottom blowing method, in particular the reliably controllable course of the refining, the advantages of the process metallurgy such, for example, as the low final carbon content and the low iron oxide content in the flush slag, the ensured capacity for melting down scrap and the higher yield are preserved.

The invention solves this problem in the way that during a considerable part of the refining time 20% to 80% of the amount of oxygen for refining is fed to the melt through one or more gas jets directed onto the surface of the bath, which act in the converter gas volume as free jets. The remaining amount of the oxygen is blown in through the nozzles arranged in the converter brickwork underneath the surface of the bath.

With the application of the teaching of the invention the proportion of solid iron-carriers, e.g., the proportion of scrap is raised by 5 to 10 points percent, that is, with respect to the normal way of operating a OBM/Q-BOP-converter a proportion of solid iron is processed per ton of raw steel, which is increased by 50 kg to 100 kg. Hence the proportion of scrap is also considerably higher than in the case of the usual oxygen top-blowing method. Moreover it is also to be noted that the higher proportion of scrap in the case of the top-blowing method in comparison with the through-blowing method is to be attributed partially to the exothermic oxidation of iron. In the case of the method in accordance with the invention the iron oxide content in the slag remains on the contrary as low as in the case of the oxygen through-blowing method.

By oxygen top-blowing alone without the simultaneous feed of oxygen underneath the surface of the bath, the advantages of the invention cannot be achieved. In the case of oxygen top-blowing it is necessary for the achievement of the metallurgical reactions to form in the converter as quickly as possible a foamed slag. This foamed slag then fills a considerable part of the free space in the converter above the surface of the bath and the oxygen jet during most of the time of the course of the refining blows into this foamed slag, that is, not into a free gas space. With a method of operation of that kind an increase in the iron oxide content of the slag is arrived at, with the corresponding metallurgical effects such as are known from the oxygen top-blowing method. Under these conditions of operation the advantages in accordance with the invention, in particular the increased proportion of scrap and a low iron oxide content in the slag cannot be achieved.

An important feature of the invention consists in the formation of foamed slag in the converter being avoided. This aim is achieved in particular by the feed of at least 20% of the overall amount of oxygen below the surface of the bath. At the same time a considerable part of the lime is blown in with this oxygen through the nozzles arranged below the surface of the bath.

In the case of the method according to the invention the amount of oxygen fed in above the surface of the bath is passed into the converter in such a way that a free jet is formed in the gas space and this gas jet impinges on the surface of the melt. By doing this one succeeds in transferring to the melt about 90% of the energy produced by the afterburning of the converter exhaust gases. For the action in accordance with the invention it is necessary that the free jets penetrate a certain distance into the gas space, within which they suck in considerable amounts of the converter exhaust gases. In that way a vigorous mixing of oxygen and converter exhaust gas occurs and there impinges then against the surface of the bath only a hot gas which consists of CO and $CO_2$ and in practice no longer contains any free oxygen. The formation of brown smoke, i.e., the combustion of iron is correspondingly reduced and the method in accordance with the invention exhibits in a similar way to the OBM/Q-BOP-method only a loss from the evaporation of iron of 0.3%.

In the case of the known introduction of oxygen into the upper part of the converter by nozzles arranged horizontally or inclined up to 20° out of the horizontal for the CO-afterburning, even with amounts of oxygen of 10% to 20% of the overall amount of oxygen no sensible heat can be transferred to the melt. The afterburning of the converter exhaust gases leads merely to damage to the refractory material. In particular in the case of these methods a premature wear of the brickwork occurs in the converter cap and on the walls opposite the oxygen nozzles. This wear of the brickwork is to be attributed to a sharp rise in temperature in the upper region of the converter and a further increase in the proportion of oxygen beyond 20% can merely produce additional damage to the refractory lining. A sensible transfer of heat to the melt is according to experience hitherto not possible with this known technique of oxygen feed.

The method in accordance with the invention leads on the other hand to no increased wear of the brickwork. This advantage is certainly to be attributed to the fact that no gas jet at high temperature strikes the refractory converter brickwork - on the contrary it is an essential feature of the invention that the free jets in the converter gas volume are directed onto the surface of the bath of melt.

In the case of the application of the method in accordance with the invention an increase in the proportion of scrap to the lower limit of the specified range of 40 to 50 kg per ton of raw steel is already achieved when the amount of oxygen blown onto the bath amounts to at least 20 to 30% of the amount of oxygen for the refining. But it has proved advantageous to divide up the overall amount of oxygen into approximately equal parts to the nozzles below the surface of the bath and the system of introduction of oxygen into the upper converter space. Thus, for example, in the case of an amount of oxygen blown onto the melt, of 40% of the amount of oxygen for the refining, a proportion of scrap increased by about 6 points percent may be achieved. The proportion of scrap defined as the ratio by weight of scrap to liquid steel is accordingly increased from 27% usual in the case of the bottom blowing method to 33% in the case of the method in accordance with the invention. Obviously the proportion of pig iron is reduced correspondingly. The oxygen fed in altogether is moreover higher by about 12% with respect to the proportion of oxygen of about 60 $Nm^3/t$ of pig iron which would be necessary in the case of an ordinary oxygen through-blowing method. The carbon content of the finished steel melt amounts to about 0.02% and the iron oxide content in the final slag is 15%. With a carbon content of about 0.05% an iron oxide content in the slag of about 8% results. This iron oxide proportion in the slag corresponds with the comparable values of charges which are produced according to the OBM/Q-BOP-process.

The consumption of oxygen increased by about 12% compared with the conventional method allows about 24% of the CO in the converter exhaust gas to be burned to $CO_2$. The amount of heat released in that case is sufficient (with a thermal efficiency of 90%) for melting down an additional amount of scrap of 6 points percent. Thus by the method in accordance with the invention one succeeds in transferring nearly the whole amount of heat which results from the combustion of CO to $CO_2$, to the melt.

In accordance with an advantageous development of the invention at least one oxygen tuyere of two concentric pipes is located above the surface of the bath in the converter brickwork. The oxygen flows through the inner pipe of the tuyere; the annular gap between the two tuyere pipes serves for the introduction of the protective medium, preferably gaseous or liquid hydrocarbons. The oxygen fed into the converter is completely used up. A considerable proportion of about 75% takes part in the reactions of refining, the remaining amount of oxygen serves for the CO-afterburning and thereby makes possible the increased proportion of scrap.

The tuyeres above the melt are arranged in the converter in such a way that the oxygen jet travels a sufficient distance in the converter gas space. In order to make full use of the invention the path of the oxygen jet between the outlet openings from the oxygen feed systems and the static surface of the bath must correspond with about 50 to 200 times the diameter of the outlet openings.

In the case of the usual converter geometry, the oxygen inlet tuyeres are mounted in the converter sidewall at an inclination of more than 35°, preferably more than 45° out of the horizontal in the direction of the surface of the bath.

The gas jet which consists essentially of CO and $CO_2$ impinges at a high temperature which is considerably above the bath temperature and at a rough estimate amounts to about 2500° C., against the surface of the bath. For the reaction with the melt and for the transfer of heat there is available a very large surface which originates from the amount of oxygen fed in below the surface of the bath and the violent movement of the bath resulting from it. In so far as knowledge about the movement of the bath in the converter are available, for example, from tests on models, one must reckon with a zone of spatter and eruption at the surface of the bath of at least 1 m high. The thereby greatly increased reaction surface which 1 meter the case of the method in accordance with the invention is maintained during a considerable part of the refining, is very probably decisive in the high degree of utilization of the oxygen and the good transfer of heat to the bath.

In a bottom-blast oxygen through-blowing converter of, for example, 60 tons capacity and approximately spherical form, above the converter trunnions a tuyere is installed on each side in the refractory brickwork at an angle of inclination of about 45°. The tuyere outlet openings lie at the inner face of the converter about 2 meters above the surface of the bath in the freshly bricked vessel. With increasing time of use the distance increases to about 3 meters. The oxygen tuyeres consist of two concentric pipes with an internal diameter of the inner pipe for the oxygen of 40 mm. The width of the annular gap between the inner and outer pipe amounts to about 1 mm. For the protection of the tuyeres against speeded-up wear in comparison with the refractory brickwork, 1% by vol. of propane, referred to the amount of oxygen, is passed through the annular gap.

In the case of an overall oxygen feed of about 20000 $Nm^3/h$ of which about 10000 $Nm^3/h$ flow through the bottom tuyeres and about 10000 $Nm^3/h$ through the two sidewall tuyeres above the surface of the bath, the refining time amounts to about 10 min. The amount of cooling scrap is in the case of this proceedure about 4 tons higher with respect to the same overall oxygen feed exclusively through the bottom tuyeres. The iron oxide values in the slag correspond with the content in the case of bottom blowing.

A larger number of tuyeres may be built into the refractory brick-work above the surface of the bath. An stalled height of over 2 meters above the surface of the bath is preferred. This height allows of favourable structural solutions. In the case of the requirement in accordance with the invention, of directing the tuyeres onto the bath it is simpler to arrange them in the upper part of the converter, the socalled cap, since because of the slope of the cap the length of the tuyeres in the converter brickwork becomes shorter. It is thereby inter alia easier to adapt the brickwork to the tuyere tubes especially if more than one tuyere is built in on each side of the converter in the region above the two trunnions. For example, 6 tuyeres, i.e., 3 tuyeres on each side of the converter, are built into a converter about 2 meters above the surface of the bath. The tuyere mouths lie on the inner face of the converter in the region of transitition from the cylindrical part of the converter to the upper converter cone. The inclination of the tuyeres with respect to the horizontal amounts to 45° to 70°. The tuyeres are aligned in such a way that the regions of impingement of the gas jets are distributed approximately uniformly over the surface of the bath.

An additional variant upon the arrangement of the tuyeres, which leads to a further increase in the proportion of scrap, beyond 5 points percent, consists in aligning the areas of impingement of the gas jets in such a way that they strike the surface of the bath in the region of maximum thickness of the layer of slag. This region of the surface of the bath lies in the circular segments next to a central strip along which the bottom nozzles are distributed. By this measure it is possible to increase the proportion of scrap up to 10 points percent as compared with the oxygen through-blowing method. The consumption of oxygen is increased in that case by about 20% with respect to the oxygen for refining. This surprising effect is probably to be explained by the fact that the gas jets out of the inlet tuyeres preferably strike the molten slag above the surface of the bath and that in addition a considerable rotation of the converter exhaust gases is achieved by the obliquely running oxygen jets and hence an improvement in the drawing off of these exhaust gases.

The oxygen blown onto the bath may be fed through a lance. The use of a lance for the oxygen feed above the surface of the bath proves particularly desirable when appropriate devices are already available at a converter installation. The lance clearance, i.e., the distance between the oxygen outlet openings on the lance and the surface of the bath in the converter is normally chosen to be large similarly to the sidewall tuyeres, at least 2 meters. It must furthermore be observed that the gas jets leaving the mouth of the lance, in a similar way to the sidewall tuyeres, strike the surface of the bath and do not touch the converter sidewall. The way of operation of the lance has accordingly to be altered decisively as compared with the known oxygen top-blowing process. In particular the existence of foamed slag in the converter is to be avoided, which in accordance with the invention is effected by blowing in a considerable part of the amount of lime in the form of lime dust through the bottom tuyeres.

The number of the bottom tuyeres may in the case of a through-blowing converter after its conversion to the refining method in accordance with the present invention be reduced. No disadvantages are connected with this step so long as the cross-section of tuyere installed underneath the surface of the bath in the converter is adequate for conveying into the converter during the refining the total amount of the finely divided slag-formers. Normally one can start out in that case from charging rates of the slag-formers into the oxygen of up to about 10 kg/Nm$^3$ of oxygen. For example, in the case of the refining of pig iron low in phosphorus and the low proportions of lime connected with it, fewer tuyeres are necessary underneath the surface of the bath than in the case of the refining of pig iron rich in phosphorus, which as is known demands higher proportions of lime for the formation of slag.

In the case of the application of the method in accordance with the invention in a bottom blowing converter which, for example, is equipped with two additional sidewall tuyeres above the surface of the bath in the region of the converter trunnions, the number of tuyeres in the converter bottom may be reduced. In a 200 t OBM/Q-BOP-converter which is equipped with 20 tuyeres and a total blast cross-section of 150 cm$^2$ and in which pig iron low in phosphorus is being refined, according to the method in accordance with the invention 10 bottom tuyeres with a total blast cross-section of 80 cm$^2$ and respectively two top-blowing tuyeres above the converter trunnions with a total oxygen blast cross-section of 50 cm$^2$ are sufficient. In the converter so re-equipped 200 t of steel are produced in a refining time shortened by about 25%, that is, of about 8 to 10 min. In that case the whole of the process-metallurgical features of the oxygen through-blowing method are preserved. There follows as an advantage an increased cooling scrap proportion of 12 tons, corresponding to about 6%.

Furthermore the consumption of liquid or gaseous hydrocarbons for the tuyere protection is reduced by about ⅓ as compared with the oxygen through-blowing method. This smaller consumption of hydrocarbons is composed of a portion reduced by about 50% for the bottom tuyeres and a lower rate of protective medium of about 1% by wt. referred to the oxygen, for the top-blowing tuyeres. The amount of hydrocarbons reduced to about half the proportion which flows through the bath yields besides the cost saving also the further advantage of a lower hydrogen content in the finished steel. Whilst in the case of the ordinary through-blowing process the hydrogen content in the finished steel is of the order of magnitude of 4 ppm, in the case of the application of the method in accordance with the invention it amounts on the average to 3 ppm. The division of the whole amount of oxygen for the refining results in that case in approximately equal parts to the top blowing and bottom tuyeres.

A number of advantages are connected with the reduced number of tuyeres in the converter bottom. Thus the total area over which the tuyeres are distributed is reduced, i.e., in the case of the usual way of installation along a central strip of the bottom a smaller width of strip results. From that again results a greater volume for the melt; the same converter is then suitable for higher charging weights or respectively the converter capacity is thereby increased. With fewer tuyeres below the surface of the bath a position of installation in the lower region of the converter wall also has an advantageous effect. For example, so-called annular-slot tuyeres have proven practical. With these tuyeres in accordance with the German Patent 2438142 the oxygen flows with or without charging with lime, through an annular gap which permits larger throughput rates per tuyere. The depth of penetration of this gas jet is likewise less than in the case of normal tuyeres and hence the gas jets from the sidewall tuyeres do not strike the opposite wall of the converter. A premature wear of the brickwork is thereby avoided.

Moreover a smaller number of tuyeres in the converter bottom results in structural simplifications. A smaller lime-distributor is sufficient and the number of the feed pipes for the oxygen and the protective medium on the converter bottom is reduced. The cross-sections of the common supply mains as far as the lime-distributor and for the tuyere protective medium may be correspondingly reduced.

The oxygen feed to the tuyeres below the surface of the bath and to the systems of introduction directed at the surface of the bath is effected normally by separately controllable supplies which may be regulated independently of one another. For example, after the charging, upon setting the converter upright in the blast position, the top-blowing system may be operated with the required amount of oxygen, whilst the bottom tuyeres upon setting the converter upright are fed with nitrogen and switched over to oxygen and protective medium only after reaching the blast position. As compared with normal practice in the case of application of the method in accordance with the invention, in which approximately the same amounts of oxygen flow through the top-blowing and through-blowing tuyeres, operation can be effected even with different amounts of oxygen flowing through.

For example, in the case of a pig iron having a high silicon content of 1.5 to 2% it proves favourable in the starting phase to pass about 60% of the amount of oxygen through the tuyeres in the converter bottom and to work with higher lime charging in order to avoid in the converter slags rich in silicic acid.

A further possibility is based on feeding additional heat to the melt during refining in the converter and hence the melting down of scrap beyond the proportion of scrap increased by 5 to 10 points percent. In that case carbon-containing fuels, for example, coke, carbonized lignite, graphite, coals of different qualities and mixtures of them are introduced into an iron melt in the converter. The feed of oxygen for the refining of the melt and for the combustion of these fuels is in accordance with the invention effected simultaneously in the form of gas jets directed onto the surface of the bath and below the surface of the bath, for example, through the bottom tuyeres of a OBM-converter.

The oxygen may be blown in onto the surface of the bath by, for example, one or more sidewall tuyeres which are arranged in the way described, above the converter trunnion. The sidewall tuyeres are constructed in a similar way to the tuyeres in the converter bottom, from two concentric pipes. For the protection of these tuyeres against premature burning away in comparison with the converter brickwork, 0.5 to 5% of hydrocarbons referred to the oxygen throughput, are fed through the annular gap. Obviously the top blowing of the oxygen with a lance in the way described is also possible.

The feed of the carbon-containing fuels may be effected in different ways. An advantageous possibility consists in blowing in the carbon-containing fuels as powder below the surface of the bath into the iron melt through appropriate tuyeres with a carrier gas. As the carrier gas, for example nitrogen, CO, $CH_4$ or respectively natural gas and inert gases, for example, argon, have been used. This feed of fuel is effected via one or more tuyeres. The simplest solution consists in employing for it one or more of the bottom tuyeres existing in a OBM-converter. In this case the inner pipe of the tuyere conveys the suspension of ground fuel and carrier gas. But for the fuel feed one or a greater number of tuyeres may be used, of a number of concentric tubes, for example, three. In the case of tuyeres of three concentric tubes it is advantageous to feed the fuels through the central pipe, oxygen through the annular gap next the central pipe, and through a second outer annular gap the usual hydrocarbons for the protection of the tuyeres. An appropriate regulation of the amount of oxygen enables the formation of deposit at the tuyere mouth to be altered in the required form. As soon as the deposits at the tuyere mouth become too big, for example, reach a height of over 150 mm and hence the danger exists that upon charging scrap the tuyeres get damaged, the oxygen feed to the tuyeres is increased and hence the size of the deposit at the tuyere mouth is reduced. The amount of oxygen may be regulated the opposite way in case the tuyere deposit is too small.

It is also within the meaning of the invention to charge the fuels continuously or in portions into the converter. The feed is effected by appropriate devices, e.g., sliding over the converter mouth or openings in the upper converter sidewall. For example, the feeding of coke dust through the tap hole has been utilized. The carbon-containing fuels may also be introduced into the converter together with the slag-formers such as lime. The fuels are preferably used dry especially if they are blown in below the surface of the bath in powder form.

The application of the method in accordance with the invention leads approximately to a doubling of the thermal efficiency of the fuels introduced in comparison with the methods which have become known hitherto, in which fuels were also introduced into the iron melt and the whole of the oxygen is either passed into the melt or is blown onto the bath by a lance.

Only by the application of the method in accordance with the invention does the use of carbon-containing fuels gain considerably in significance and become economically attractive. The carbon-containing fuels especially coke dust which is favourable in price, thereby become suitable as energy carriers in order to melt down scrap. What economical advantages thereby arise has obviously to be considered in relation to the price of scrap. For example, 150 kg of coke are sufficient for melting down by the method in accordance with the invention 1 ton of scrap additionally in the production of steel. This corresponds approximately with a thermal efficiency of about 30%. The known methods need at least about 300 kg of coke for 1 ton of additional scrap and from that is calculated a thermal efficiency of about 15%.

By the method in accordance with the invention the proportion of the solid iron-carriers, in particular the proportion of scrap, in a converter may be increased at option up to the production of steel without liquid pig iron, i.e., a 100% melt of solid iron-carriers. But it is particularly advantageous without having to take into account a significant prolonging of the refining time to work with a lower proportion of solid iron-carriers, e.g., a proportion of scrap up to about 50%. An increase of the proportion of scrap beyond 50% brings with it a significant prolongation of the period following charging up to about doubling in the case of charges of 100% of solid iron-carriers e.g. scrap.

The method in accordance with the invention proves in practice very flexible and permits adaptation according to different operating conditions. Already the feed of oxygen for the OBM tuyeres below the surface of the bath and the oxygen top-blowing system, which can be increased independently of one another, reveal new possibilities of influencing the heat balance in the steel refining process. The increased capacity for melting down scrap by the amount of oxygen blown onto the bath can obviously be made use of wholly or partially for raising the final temperature of the charge and simultaneously adjusting the proportion of scrap between the usual level as in the case of the OBM/Q-BOP-process and the proportion increased in accordance with the invention by about 5 to 10 points percent.

Moreover in the case of the increase in the proportion of scrap not having been completely exhausted, by an alteration of the amount of oxygen being blown onto the surface of the bath the final temperature of the finish-refined steel melt can be varied. This trimming possibility can be made use of to work with a constant proportion of scrap and to adjust the final temperature of the charge to be operationally correct by the ratio between the amounts of oxygen which are fed to the melt above and below the surface of the steel bath. For example, about 1 ton of additional scrap in the case of a charging weight of about 60 tons corresponds with a temperature difference of about 25° C.

This described possibility of temperature correction by the method in accordance with the invention proves extraordinarily useful in its operational application, in particular with a view to accuracy of aim at tapping temperature in the production of steel.

The invention is explained with regard to details with the aid of the drawing. The drawing shows a longitudinal section through a converter having two top blowing tuyeres in the upper part of the converter.

The converter consists of a steel plate jacket 1 with refractory brickwork 2. In the replaceable bottom 3 of the converter bottom tuyeres, i.e., ordinary OBM tuyeres 4 of two concentric tubes are arranged. The central tubes of the bottom tuyeres 4 are connected to the lime distributor 5 by the feedpipes 6. The oxygen-lime dust suspension is fed to the lime distributor 5 through the common main 7. The supply to the annular gaps in the bottom tuyeres 4 is effected either by gaseous or liquid hydrocarbons. The changeover from gaseous to liquid hydrocarbons is done by the pressure controlled changeover valves 8 which are fed respectively via the individual supply pipes 9 with gaseous and 10 with liquid hydrocarbon. A pipe 11 leads from the changeover valve 8 to the annular gaps in the tuyeres. Through this pipe 11 flow either gaseous or liquid hydrocarbons. Usually the tuyere flange and the changeover valve 8 form one component.

Liquid hydrocarbons are introduced mainly as fuel during the scrap preheating phase into the annular gaps in the bottom tuyeres 4, i.e., when the bottom tuyeres are operated as burners. During the refining phase in the converter, on the contrary gaseous hydrocarbons are employed for tuyere protection, which have proved particularly safe in operation.

Two oxygen inlet tuyeres 13 are built into the brickwork 2 of the converter 1 above the converter trunnions 12, and consist likewise of preferably two concentric tubes. These oxygen inlet tuyeres lie about 2 meters above the surface of the bath 16. They are mounted at an angle of inclination 17 of about 45° with respect to the horizontal and directed onto the surface 16 of the steel bath in the converter 1. Through the oxygen inlet tuyeres 13 in the upper sidewall of the converter flows about 20–80%, preferably 30–70% of the total amount of oxygen.

At the outlet opening 18 of the side tuyere 13, immediately after putting into service a free jet 19 is formed in the gas volume 20 of the converter 1. This gas jet 19 emerging from the mouth 18 at approximately the speed of sound sucks in according to the injector principle large amounts of exhaust gas from the steel refining process, essentially CO. The exhaust gas being sucked in is illustrated in FIG. 1 in the form of arrows 21.

The free jet 19 after it has flowed through the converter gas volume 20 strikes at high speed against the surface 22 of the metal-slag bath. Through the powerful suction effect of the free jet 19 in the gas volume 20 it succeeds, which can be proved by analysis of the exhaust gas, in burning large amounts, at least about 20% of the amounts of CO and $CO_2$ in the exhaust gases. The energy thereby released is fed to the metal melt 23 with an efficiency of about 90%. A significant feature of the invention consists, during the top-blowing of oxygen, in feeding simultaneously to the steel melt through the bottom tuyeres 4, oxygen in amounts of 20 to 80%, preferably, 30 to 70% of the total amount of oxygen and in charging this partial flow of oxygen with the essential amount of lime dust which is necessary for the refining process.

Through the feeding of the oxygen via the bottom tuyeres 4 with and without charging with lime a considerable movement of the bath is achieved in the converter 1, which again leads to rapid equalisation of concentrations in the whole melt. The zones of fill illustrated diagrammatically in FIG. 1 can form in the converter: the steel bath zone 23 with the steel bath surface 16 and the steel-slag bath zone 24 with the approximate surface 22. Above them is the converter gas space 20.

The steel bath-slag zone 24 is not to be confused with the foamed slag in the LD-converter. In accordance with FIG. 1 it is in the zone 24 of the spatter and eruption region of the steel melt in which the steel and slag come into intimate mixing. Into this reaction zone 24 between the steel and slag melts, existing in forced movement, enters with the momentum of the high gas speed the high-temperature free jet 19 and transfers its heat energy almost completely to the melt.

It may also be conceivable that in the free jet 19 the gases are largely dissociated and the gases upon striking against the metal-slag surface 22 or respectively upon entering the steel-slag bath zone 24 recombine and the heat thereby released is fed directly to the melt 23.

In a 60 tons-converter which exhibits the shape of the refining vessel illustrated in FIG. 1 and which in the freshly bricked state has an internal volume of 55 m$^3$, there are 10 nozzles on a central strip approximately 90 cm wide. In the case of the application of the usual through-blowing technique in accordance with the OBM method this converter is charged with about 18 tons of scrap of mixed composition and about 49 tons of pig iron. The composition of the scrap consists, for example, of 5 tons of sheet metal bales, 7 tons of commercial mixed scrap and 6 tons of rolling mill and steel works reject scrap with individual pieces of up to 4 tons weight. The average pig iron analysis comprises 3.5% carbon, 0.7% silicon, 1% manganese, 1.7% phosphorus. After a total refining time of 12 minutes which is subdivided into a main blast period of 10 minutes and a two-minute after-blowing, the steel is produced with a composition of 0.03% of carbon, 0.1% manganese, 0.025% phosphorus and is tapped from the converter. During this refining time 3000 Nm$^3$ of oxygen are fed to the converter through the bottom tuyeres at blast rates of 15000 to 20000 Nm$^3$/h. As the tuyere protective medium about 60 Nm$^3$ of propane flow through the annular gaps in the bottom tuyeres at a blast rate of 300 to 350 Nm$^3$/h. About 4 tons of lime dust are conveyed into the converter by the oxygen. The feed of lime is effected preferably equally at the start of the refining process during the desiliconization period and towards the end of the refining or respectively during the after-blowing.

In the same converter for application of the method in accordance with the invention two oxygen inlet tuyeres 13 were installed about 2.5 meters above the surface of the bath in the region above the two converter trunnions. The tuyeres 13 consist of two concentric tubes with a central tube of 50 mm internal diameter for the oxygen feed, surrounded by an annular gap of about 2 mm wide. The centering of the two nozzle tubes is effected by 6 ribs on the oxygen tube.

The converter is charged with 22 tons of scrap corresponding with the mixture already mentioned and 45 tons of pig iron of the aforesaid analysis. At the start of the refining process the bottom tuyeres 4 and the top-blowing tuyeres 13 are acted upon each with 10000 Nm$^3$/h of oxygen. The propane blast rate amounts to about 165 Nm$^3$/h for the bottom tuyeres and about 100 Nm$^3$/h for the top-blowing tuyeres. After a total refining time of 10 min. which is composed of 8 minutes of main blast period and 2 minutes of after-blowing the finished steel with the aforesaid composition is tapped from the converter. The feed of the amount of lime of about 4 tons is effected in accordance with the same feed scheme as in the case of the through-blowing process, exclusively through the bottom tuyeres.

Into a 200 tons-converter which in accordance with a further development of the invention has available above the surface of the bath 4 oxygen inlet tuyeres 20 which respectively in pairs above the converter trunnions are directed onto the bath at an angle of inclination of approximately 60° out of the horizontal, are charged 70 tons of scrap and 150 tons of pig iron with a composition of 4% of carbon, 1% of manganese, 1.2% of silicon, 0.1% of phosphorus. Via the 16 tuyeres in the converter bottom having an oxygen tube diameter of 28 mm 5000 Nm$^3$ of oxygen are fed to the charge during the refining time of 10 minutes and simultaneously through the four top-blowing tuyeres having an oxygen tube diameter of 50 mm, 5000 Nm$^3$ of oxygen. The amount of lime of 15 tons needed for the slag formation are charged in pulverized form exclusively into the oxygen from the bottom tuyeres. The charging rates vary during the refining time. Through the refining method in accordance with the invention, in this OBM-converter a an additional 12 tons of scrap, corresponding with an increase of 6 points percent, could be processed. The refining time becomes shorter by about 20%, with a corresponding increase in production.

In a further application of the method in accordance with the invention the 200 tons-OBM/Q-BOP-converter now operates with a reduced number of bottom tuyeres and two oxygen top-blowing tuyeres arranged above the surface of the bath. The converter now has available 10 tuyeres arranged in the converter bottom in two rows as compared with a number of 16 tuyeres in the case of the OBM/Q-BOP-method. The diameter of the oxygen inlet tubes in the bottom is 28 mm and the whole amount of lime of 15 tons necessary for the slag formation in the case of the refining of low-phosphorus pig iron can be fed to the melt during a shortened refining time of 8 minutes. The necessary overall amount of oxygen of 10000 Nm$^3$ is distributed approximately evenly over the bottom and top-blowing tuyeres at blast rates of 70000 Nm$^3$/h. Through the arrangement of the bottom tuyeres in two rows, i.e., in a narrow strip parallel with the pivot of the converter, a larger free converter volume for the melt is achieved in the converter, whilst preserving the necessary safety distance between the surface of the bath and the tuyeres in the position of the converter for taking samples or tapping. In this converter charges of up to 250 tons tap weight are now produced.

Into the previously described 60 tons-converter are charged 34 tons of scrap and 33 tons of pig iron of the aforesaid composition. At the start of the refining about 10000 Nm$^3$/h of oxygen are fed to the converter through the bottom tuyeres and about the same amount of oxygen through two sidewall tuyeres in the cap of the converter. In parallel with that, pulverized coke is introduced into the melt at a blast rate of 180 kg/min via a bottom tuyere. During a refining time of about 18 min. corresponding with a period following charging of 40 minutes, altogether 6000 Nm$^3$ of oxygen and 3200 kg of coke are fed to the converter. The tap weight amounts to 60 tons and the steel has a composition of about 0.03% of carbon, 0.1% of manganese, 0.025% of phosphorus. This analysis corresponds with the steel composition of steel produced according to the OBM method.

A further charge was produced exclusively from scrap without the addition of liquid pig iron. In that case first of all 67 tons of scrap was charged in two batches. This scrap is preheated with 25 liters of oil per ton. After a preheating time of about 10 minutes the feed of pulverized coke starts and simultaneously the amount of oxygen is increased from the stoichiometric ratio to the proportion of oil up to the refining oxygen blast rate and the tuyeres above the surface of the bath are placed into service. After an overall preheating and blast time of 50 minutes the desired steel charge was tapped. The fuel consumption was 25 liters of oil and 65 kg of coke per ton of scrap. The cost of the fuel and the oxygen needed for combustion at present prices are about 35,--DM per ton of scrap.

The combination of the method in accordance with the invention with the preheating of scrap according to the German Patent Application P2816543.7 not hitherto disclosed, in particular in the case of the use of higher proportions of scrap as far as charges only of scrap, is within the meaning of the invention. In the case of this combination of methods the carbon-containing fuels are preferably blown into the melt in powder form below the surface of the bath.

It is within the meaning of the present invention to use instead of scrap also other cooling media such, for example, as sponge iron, pellets, solid pig iron, iron ore and limestone. The features in accordance with the invention, in particular as regards the formation of the free jet, may obviously also be applied in the case of other steel refining processes.

The teaching of the present invention can furthermore be applied in general to the supply of energy to iron melts such, e.g., as to the melts in an iron bath reactor, described in the German O/S 2520883.

I claim:

1. A method of producing steel in a convertor comprising:
   (1) introducing oxygen shrouded by a protective medium into the convertor by means of tuyeres located in the lining of the convertor below the surface of a bath in said convertor; and
   (2) concurrently therewith blowing oxygen onto the surface of the bath;
   the improvement of that method comprising that for at least a major part of the refining time, 20 to 80% of the oxygen is introduced into said convertor by gas jets directed onto the surface of the bath which act as free jets in the space above the surface of the bath, said jets having a sufficient velocity to suck in large amounts of reaction products of the bath, and that the remaining amount of oxygen is concurrently blown into said bath by means of said tuyeres, whereby the heat balance in said method is improved and the proportion of scrap charged into said convertor for melting is increased.

2. A method as in claim 1, characterized in that the amount
of oxygen blown onto the surface of the bath varies during the course of the refining.

3. A method as in claim 1, characterized in that the axis of the free jet is aligned obliquely onto the surface of the bath at an angle with respect to the axis of rotation of the converter of at least 35°.

4. A method as in any of the preceding claims 1 to 3, characterized in that the distance between the outlet openings of the oxygen jets and the static surface of the bath corresponds with 50 to 200 times the diameter of the oxygen outlet openings.

5. A method as in any of the preceding claims 1 to 4, characterized in that the oxygen feed onto the surface of the bath is effected by nozzles which are built into the converter brickwork and are protected against premature burning away by a shrouding of hydrocarbon.

6. A method as in any of the preceding claims 1 to 5, characterized in that the quantity of hydrocarbon for the top-blowing oxygen nozzles amounts to about 0.5 to 5% by wt. referred to the oxygen.

7. A method as in any of the preceding claims 1 to 6, characterized in that the proportionate amounts of the media blown onto and through the bath are regulated independently of one another.

8. A method as in any of the preceding claims 1 to 7, characterized in that the significant proportion of the slag-formers, in particular lime, is charged into the oxygen which flows through the nozzles underneath the surface of the bath.

9. A method as in any of the preceding claims 1 to 8, characterized in that carbon-containing fuels are fed to the iron melt in the converter.

10. A method as in any of the preceding claims 1 to 9, characterized in that as carbon-containing fuels coal of various qualities, graphite, carbonized lignite, coke and in particular coke dust as well as mixtures of them are used.

11. A method as in any of the preceding claims 1 to 10, characterized in that the carbon-containing fuels are introduced into the melt in powder form and dry underneath the surface of the bath.

12. A method as in any of the preceding claims 1 to 11, characterized in that the solid iron-carriers charged into the converter, such as scrap, solid pig iron, pellets or sponge iron, are preheated.

* * * * *